Feb. 9, 1960      G. HEWITT      2,924,043
RESONATOR
Filed Sept. 23, 1958
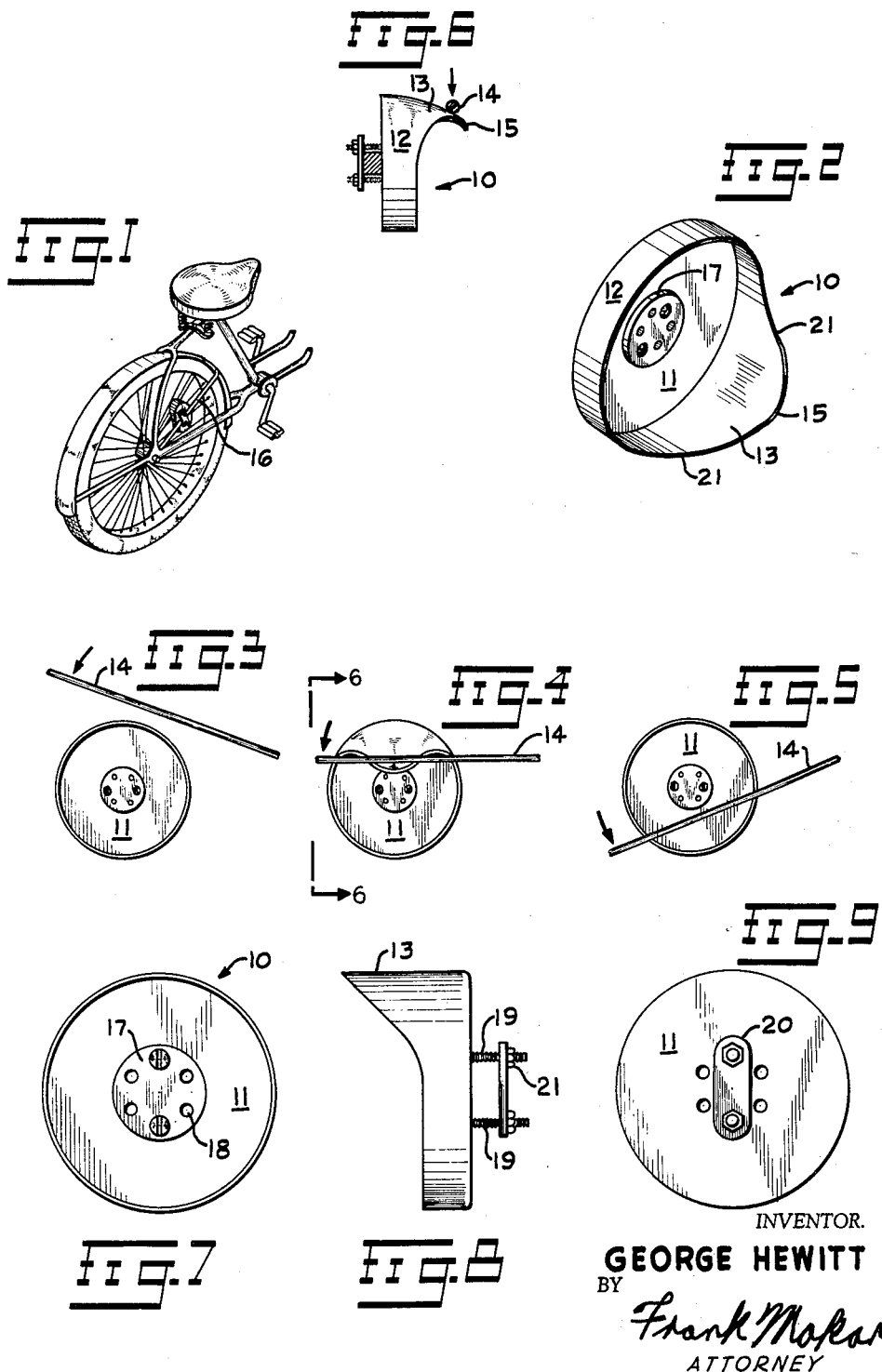
INVENTOR.
GEORGE HEWITT
BY
*Frank Makara*
ATTORNEY

United States Patent Office 2,924,043
Patented Feb. 9, 1960

2,924,043

RESONATOR

George Hewitt, Ridgewood, N.J.

Application September 23, 1958, Serial No. 762,833

3 Claims. (Cl. 46—175)

This invention relates to a sound producing device and more particularly to a device attachable to a bicycle or tricycle to make it sound like an automobile when in motion.

It is an object of this invention to produce a device which is actuated by the spokes of a rotating wheel to produce a staccato sound substantially duplicating the sound of a running internal combustion engine or automobile.

It is another object to produce a toy of inexpensive construction.

These and other objects will become apparent upon reading the following descriptive disclosure taken in conjunction with the drawing in which:

Fig. 1 is a perspective view of a rear bicycle wheel showing the mode of attaching the device to a brace of the rear wheel fender, Fig. 2 is a perspective view of the sounding device or cup, Figs. 3, 4 and 5 are sequence views showing the manner in which the wheel spoke engages the elastic sound producing flap of the resonator, Fig. 6 is a view taken on line 6—6 of Fig. 4, Fig. 7 is a front view of the device showing a plurality of apertures disposed in a central hub with a pair of bolts disposed in opposed apertures, Fig. 8 is a side view of the resonator showing the means used for attachment to a bicycle brace, and Fig. 9 is a rear view of the resonator showing the holder plate used to receive the attachment bolts.

Turning to the drawing, the resonator 10 is preferably of a circular peripheral configuration having a circular base 11 secured at a right angle integrally to a cylindrical wall 12.

Preferably the device is made from suitable plastic or suitable rubber of suitable elasticity. For example, polyethylene plastic of suitable thickness produces the desired sound effects.

The cylindrical wall 12 is preferably cup shaped and is provided with an elongated flap 13 which engages a spoke wheel 14 during operation of the device.

As shown in Figs. 3 to 6 the rotating spoke 14 engages the flap 13 adjacent the flap apex 15 turning the flap 13 radially inward toward the center of base 11 (Figs. 4 and 6). Since the resonator 10 is held stationary to a bicycle fender brace 16, the rotating spoke 14 first engages the cylindrical wall of the flap 15 and then gradually depresses the flap inwardly as the spoke slides on the flap. Ultimately the spoke 14 slides off the flap apex 15 causing the flap to vibrate, producing sound waves which are reflected in part from the base 11. Thus the base 11 functions so as to resonate the sound. Inasmuch as each successive wheel spoke 14 of a wheel having a plurality of spokes 14 produces a separate actuation of the flap 13, it is clearly seen that the over-all sound produced is of a repetitious or staccato nature.

In making the device of this invention the periphery of the device need not be circular as it may be polygonal, for example, of hexagonal configuration. Moreover, the vertical wall 12 need not be continuous around the base 11 since the opposed side walls of the flap 13 may slope continuously to engage the base 10.

In order to secure the base 11 to the brace 16, the central area of the base 11 is provided with an integral stud 17 having a plurality of circularly disposed bolt receiving apertures 18 therein.

A pair of bolts 19 are disposed in a pair of opposed apertures 18. The bolts 19 are then disposed so as to straddle the front or rear fender brace 16 with the flap turned inwardly toward the wheel spokes 14.

A holder plate 20 having a pair of spaced-apart bolt receiving apertures is disposed on the pair of bolts 19 so as to contact brace 16. Next a pair of nuts 21 are threaded securely onto the bolts 19 thereby causing the holder plate 20 to be firmly secured to the brace.

Where the resonator is turned so as to engage the spoke 14 on its convex surface (Fig. 6) the sound effect is of a certain quality and intensity. However, the resonator may be so secured to a brace 16 so that the spokes 14 engage first the opposed flap edges 21 and then slide on the edges 21 to the apex 15. In this latter modified or concave engagement the sound quality and its intensity is different from that produced by the convex engagement of the spokes with the device.

Thus a single device is capable of producing selectively either a loud or a soft purring sound.

This invention is of a generic nature and therefore is not limited to the embodiment illustrated.

I claim:

1. A motor sound simulating device for conventional bicycles consisting essentially of an integral resilient plastic cylindrical cup having a flat circular bottom integral with a relatively low circumferential vertical wall having a single integral apical flap, said flap being adapted to engage the spoke of a moving bicycle wheel, and clamping means centrally secured to said base and adapted to be secured to the bicycle frame whereby said cup is securingly disposed on said frame facing into the plane of the rotating bicycle wheel.

2. The device of claim 1 wherein the flap has a sinusoidally curved rim.

3. The integral device of claim 2 wherein the central area of said base is re-enforced and of relatively greater thickness.

References Cited in the file of this patent

UNITED STATES PATENTS

| | | |
|---|---|---|
| 2,719,385 | Wilson | Oct. 4, 1955 |
| 2,768,474 | Harvey | Oct. 30, 1956 |
| 2,874,514 | Munro | Feb. 24, 1959 |